(12) United States Patent
Schlemper

(10) Patent No.: US 8,651,060 B2
(45) Date of Patent: Feb. 18, 2014

(54) BIRDHOUSE

(76) Inventor: Ralph Charles Schlemper, St. Louis, MO (US)

( * ) Notice: Subject to any disclaimer, the term of this patent is extended or adjusted under 35 U.S.C. 154(b) by 177 days.

(21) Appl. No.: 13/239,995

(22) Filed: Sep. 22, 2011

(65) Prior Publication Data

US 2012/0042834 A1 Feb. 23, 2012

Related U.S. Application Data

(63) Continuation-in-part of application No. 12/387,126, filed on Apr. 29, 2009, now abandoned.

(51) Int. Cl.
*A01K 31/00* (2006.01)

(52) U.S. Cl.
USPC .......................................... 119/428; D30/110

(58) Field of Classification Search
USPC ......... 119/428, 501, 416, 432; D30/110, 111, D30/108, 112
See application file for complete search history.

(56) References Cited

U.S. PATENT DOCUMENTS

| | | | | |
|---|---|---|---|---|
| 1,516,381 | A | * | 11/1924 | Erickson ..................... 119/432 |
| 2,312,551 | A | | 3/1943 | Hoskins |
| 3,182,634 | A | | 5/1965 | Myaida |
| 3,804,066 | A | * | 4/1974 | Lowe .......................... 119/431 |
| 4,841,910 | A | | 6/1989 | Kilham |
| 4,846,110 | A | | 7/1989 | Reynolds |
| 5,167,099 | A | | 12/1992 | Nelson |
| 5,228,410 | A | | 7/1993 | Parker |
| 5,289,800 | A | * | 3/1994 | Walton ........................ 119/166 |
| 6,477,983 | B1 | | 11/2002 | Bette |
| 7,069,877 | B2 | | 7/2006 | Ehrreigh |
| 7,243,465 | B2 | | 7/2007 | Donoho |
| 7,320,295 | B2 | | 1/2008 | Ehrreich |
| 7,500,449 | B2 | | 3/2009 | Carter |
| D626,699 | S | * | 11/2010 | Tang ........................... D30/110 |
| 2009/0277393 | A1 | * | 11/2009 | Kuelbs et al. ................. 119/428 |

FOREIGN PATENT DOCUMENTS

GB 2240910 A 8/1991

OTHER PUBLICATIONS

Backyard chirper, Horn Bazaar Cape Cod Cottage Birdhouse and Hoome Bazaar Honemoon Cottage Birdhouse, www.backyardchirper.com/bird-bath-642.html [retrieved from internet Nov. 18, 2010] Feb. 14, 2006, 3 pages.

* cited by examiner

*Primary Examiner* — Rob Swiatek
*Assistant Examiner* — Kathleen Alker
(74) *Attorney, Agent, or Firm* — Creati Venture Law; Linda L. Lewis

(57) ABSTRACT

A birdhouse having at least four walls, a first gabled roof covering the top of the walls and extending beyond the front wall, and a bottom panel approximately covering and enclosing the bottom of the four walls; where the front wall has a first entrance opening; a front panel attached by at least one spacer to the front wall, wherein the front panel has a second gabled roof extending in front of and behind the front panel, wherein the front panel has a second entrance opening; wherein the first and second entrance openings are approximately the same diameter and are approximately horizontally aligned; wherein the first opening and the second opening are spaced apart by the at least one spacer, wherein the thickness of the spacer and the space it provides is approximately from one-half to 3 times the diameter of the first opening.

15 Claims, 5 Drawing Sheets

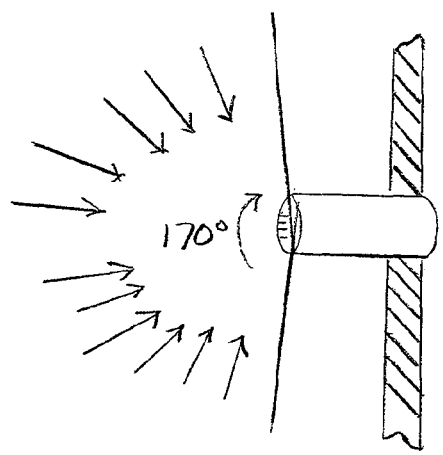
Figure 5A - Prior Art
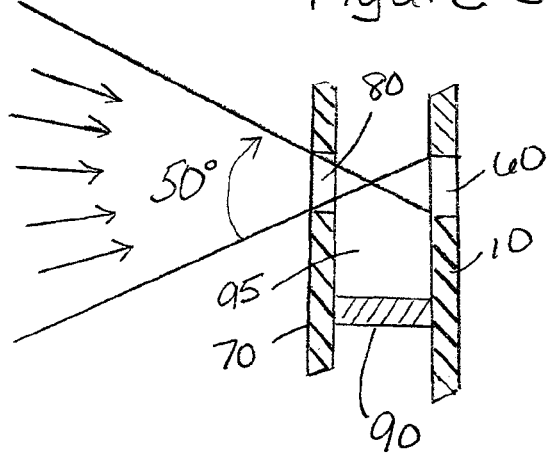
Figure 5B

BIRDHOUSE

CROSS REFERENCE TO RELATED APPLICATIONS

The present application is a Continuation-in-part application claiming the priority of application Ser. No. 12/387,126 filed Apr. 29, 2009.

FIELD OF THE INVENTION

The present invention relates to a birdhouse wherein the birdhouse has a protective front panel that inhibits the access of preying animals into birdhouses thereby protecting the nests, eggs and fledglings. The front panel is designed to prevent rain from blowing into the birdhouse and is not easily clogged with leaves, sticks or debris.

BACKGROUND OF THE INVENTION

The variety of birdhouses and similar animal shelters that exist is indicative of the number of people whose love of animals takes the form of providing various shelters and food for nature's creatures. Birdhouses are among the most popular and common forms of such shelters.

Such structures provide shelter for a variety of creatures. For example, birdhouses are designed for a variety of different birds, determined, in part, by the size and shape of the houses themselves, and by the sizes of the access openings or entrance holes into the houses.

Unfortunately, the nests, eggs and fledglings, even when in these houses, are often subject to attack by other larger, preying animals, such as, for example, squirrels, raccoons or even larger birds. While such animals may not be able to enter the birdhouses designed for smaller birds, they often have the ability to reach their heads, paws, or claws into the house and damage the nest and/or the eggs, or harm fledglings within the house.

Birdhouse entrance holes must be of a certain size in order to permit access to the birds for which they are designed. The diameters of entrance holes typically range in size between about one inch and about two and one-half inches. While many entrance holes are relatively small, they are large enough to permit some access by predators.

Various designs have been made to prevent the attack on eggs, nests or foundlings in birdhouses. U.S. Pat. No. 3,182,634 discloses a birdhouse having inside the house, behind the entrance hole, protective panels, so that an animal reaching in the hole would be stopped by the panel. This design is complicated and prevents the circulation of air to cool the birdhouse in the summer. A second design is U.S. Pat. No. 4,846,110 which discloses the attachment of a long pipe to the entrance hole of the birdhouse. This pipe projects out several inches and makes it hard for an animal to reach into the interior of the bird house. This pipe likewise has the disadvantage of blocking air circulation and can also channel rain into the birdhouse during a windy rain storm. Further, the pipe, because of its length, may become clogged with debris such as straw, leaves or sticks.

The birdhouse of the present invention overcomes the disadvantages of the previous designs in that it is simple and yet effective in protecting the nesting birds. It does not use interior panels or extended pipes which can become clogged and which channel rain into the birdhouse. The front panel is designed to reduce the amount of rain blowing into the birdhouse by about two-thirds.

SUMMARY OF THE INVENTION

The first embodiment of the present invention is a birdhouse having at least four walls, wherein one wall is the front wall, the opposite wall is the back wall, and the remaining walls are side walls; wherein the walls have a top and a bottom. The birdhouse has a first gabled roof covering the top of the walls and extending beyond the front wall, and a bottom panel approximately covering and enclosing the bottom of the four walls. The front wall has a first entrance opening. The birdhouse also has a front panel, wherein the front panel has a second gabled roof extending in front of and behind the front panel, wherein the front panel has a second entrance opening; wherein the first and second entrance openings are approximately the same diameter and are approximately horizontally aligned; wherein the front panel is attached by at least one spacer to the front wall, wherein the first opening and the second opening are spaced apart by the at least one spacer, wherein the thickness of the spacer and the space it provides is approximately from one-half to 3 times the diameter of the first opening, and wherein the birdhouse provides improved protection to a nest, eggs or fledglings by preventing large birds or animals from reaching into the birdhouse. This embodiment reduces by about two-thirds the amount of rain blown into the birdhouse.

The second embodiment of the present invention is similar to the first embodiment, except that the front panel does not have a second entrance opening, and the at least one spacer is on the side perimeter between the front panel and the front wall. This provides at the bottom an open space that acts as an entrance of the front panel and the front wall, wherein certain species such as the yellow flicker crawls up behind the front panel into the first entrance opening in the front wall and enters the birdhouse. This embodiment reduces by about 100% of the rain blown into the birdhouse.

BRIEF DESCRIPTION OF THE DRAWINGS

FIG. 5A Side perspective of prior art reference birdhouse entrance with angle of rain entering.
FIG. 5B Side perspective of first embodiment of birdhouse entrance with angle of rain entering.

DETAILED DESCRIPTION OF THE INVENTION

Figure 1:
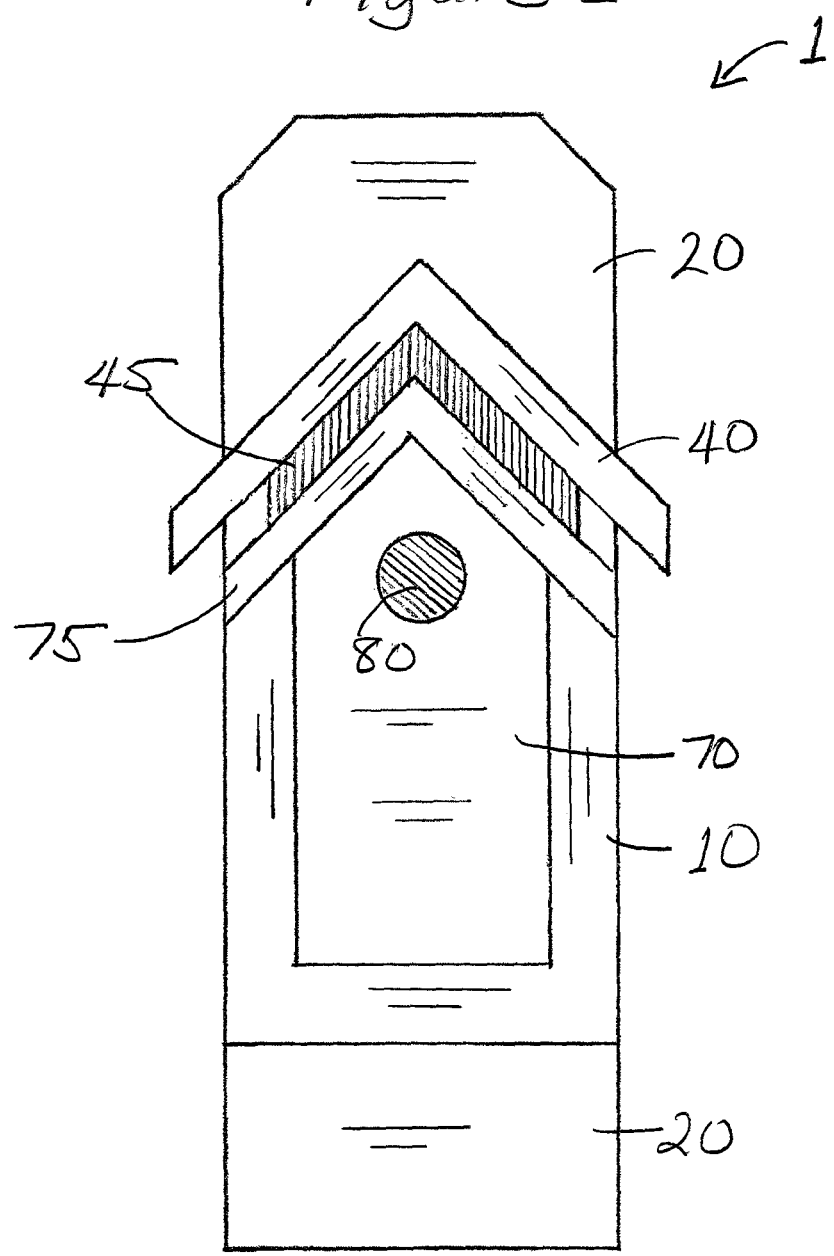
FIG. 1 Front view of birdhouse of the first embodiment.
Figure 2:
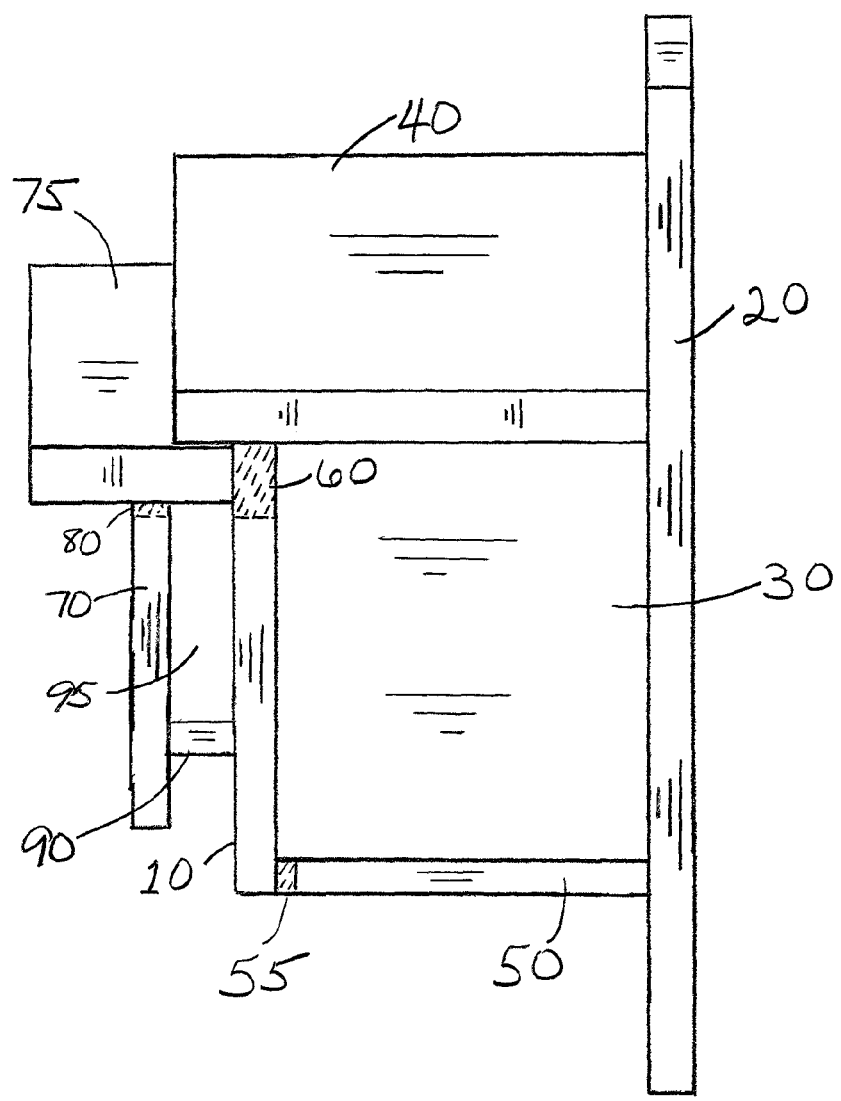
FIG. 2 Side view of birdhouse of the first embodiment.

The birdhouse 1 of the present invention is embodied in FIGS. 1-4. In FIG. 1, a front perspective of the birdhouse 1 has a front wall 10 and a back wall 20. The construction materials of the birdhouse can be of any rigid, weather-resistant material. Preferably, the house is constructed of wood, and more preferably, the wood is one inch cedar wood, which repels insects which could be harmful to the bird nest. Optionally, as shown in FIG. 1, the back wall 20 extends above and below the rest of the birdhouse, providing a mounting surface for the birdhouse suitable for mounting securely on a pole or wall. As shown in FIG. 2, the birdhouse 1 has side walls 30. The walls 10, 20 and 30 engage closingly to form the birdhouse 1. The walls have a top and a bottom. Preferably, the birdhouse 1 has four walls. On the front wall 10 is a first entrance opening 60, shown in broken line in FIG. 2.

The birdhouse has a first gabled roof 40 that is attached to the tops of walls 20 and 30 to provide a water-proof roof.

Optionally, the roof 40 can extend beyond the side walls 30 to direct rain away from the walls 30 and to provide more shade on hot sunny days. Optionally, there is a gap 45 between the first gabled roof 40 and the top of the front wall 10 that provides ventilation in the birdhouse 1 and allows the escape of hot air from the interior of the birdhouse. Preferably, the gap 45 can be from ¼ to ¾ inches wide. Preferably, as shown in FIG. 2, the roof 40 extends beyond the front wall 10 to shield the gap 45 from heat and rain. The birdhouse 1 has a bottom panel 50 that encloses the bottom of the birdhouse with the bottoms of the walls 10, 20 and 30. Optionally, the bottom panel 50 has a drain opening 55 that drains rainwater that may flow down the interior wall from the opening 60 during a hard rain storm.

The birdhouse 1 has a front panel 70 with a second entrance opening 80, shown in broken line in FIG. 2. The front panel 70 has a second gabled roof 75 which extends backward from the front panel 70 and engages with front wall 10. The second gabled roof 75 extends frontward from the front panel 70 to shield the opening 80 from heat and rain.

The first entrance opening 60 and the second entrance opening 80 are approximately the same size and are approximately horizontally aligned, as shown in FIG. 2. A spacer 90 is between the front panel 70 and the front wall 10. The at least one spacer 90 is approximately at the bottom of the front panel 70. The front panel 70, the front wall 10 and the spacer 90 create a slot 95. This slot 95 provides a deterrent to animals such as raccoons, squirrels, snakes or other predators from easily reaching into the birdhouse interior. The slot 95 further prevents wind and rain from being channeled through opening 80 directly into the interior of the birdhouse. A bird would probably use the openings 60 and 80 to enter the birdhouse 1, hopping from opening 80 to opening 60. Optionally, a small perch (not shown) is placed between the front panel 70 and the wall 10, to assist a small bird as it enters the birdhouse. The spacer 90, however, may be placed at any convenient location between front panel 70 and front wall 10.

FIG. 5A shows the angle that rain can enter a birdhouse disclosed in U.S. Pat. No. 4,846,110, about 170 degrees. FIG. 5B shows a diagram that illustrates the angle of rain that can enter the claimed birdhouse, about 50 degrees. Rain that does not blow through both opening 80 and opening 60 will drop outside the birdhouse down slot 95. The reduction is from about 170 degrees in FIG. 5A to about 50 degrees in FIG. 5B, or greater than about two-thirds reduction of rain entering the presently claimed birdhouse when compared to a birdhouse disclosed in the background references.

Figure 3:
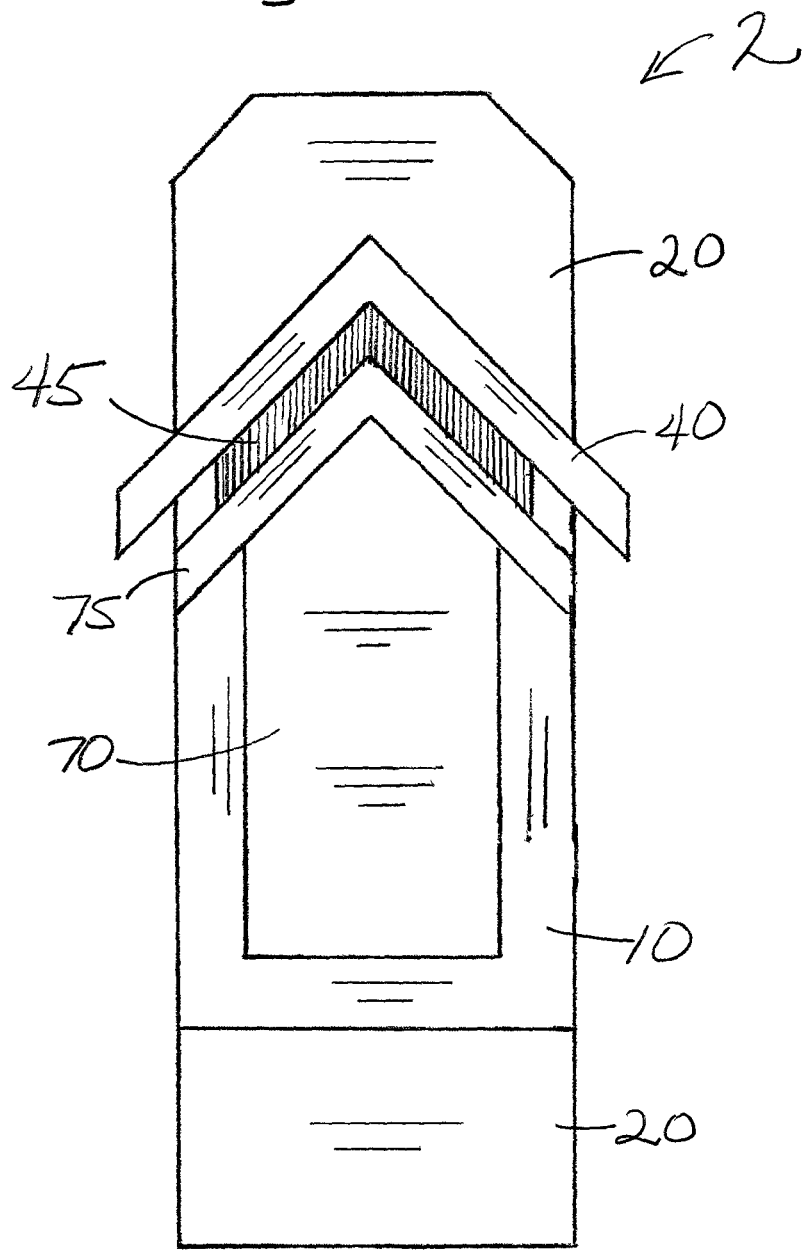
FIG. 3 Front view of birdhouse of the second embodiment.
Figure 4:
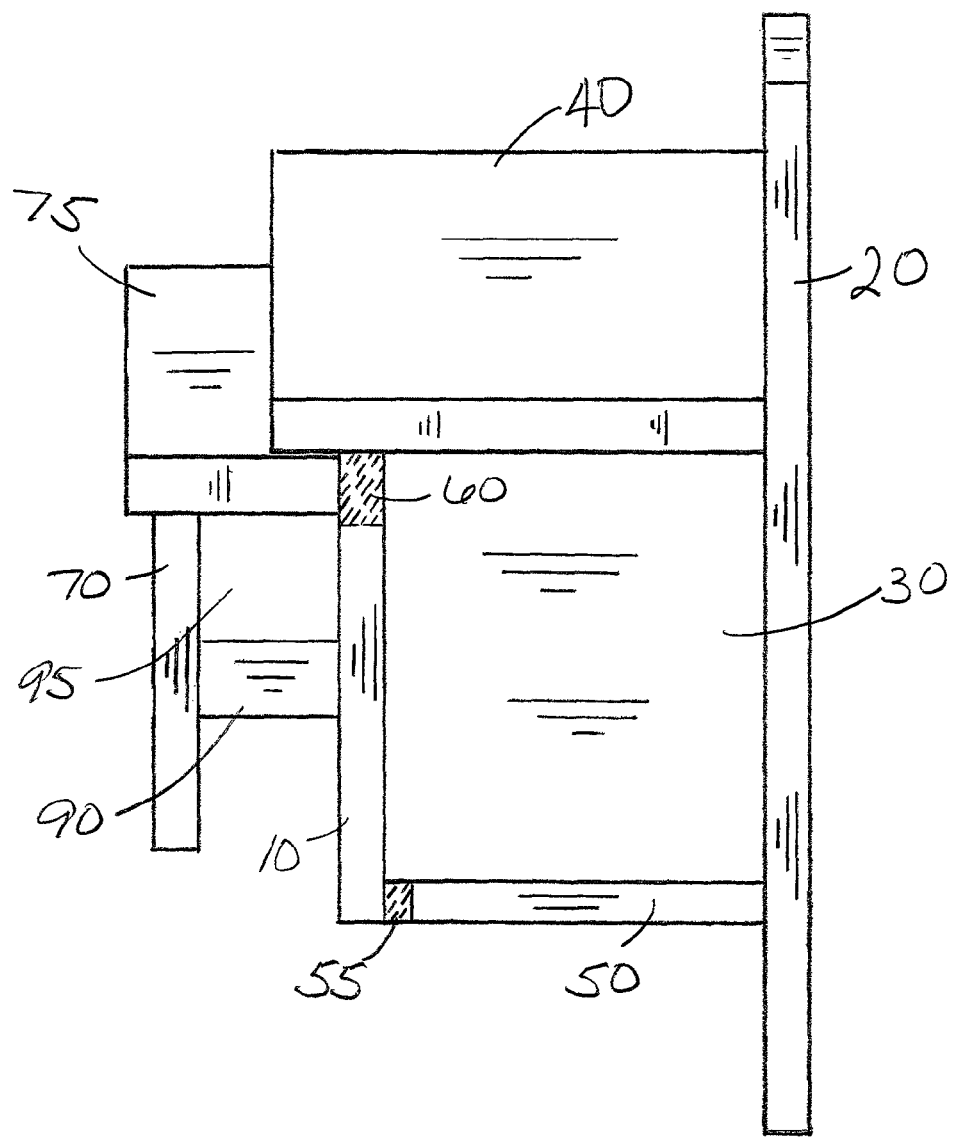
FIG. 4 Side view of the birdhouse of the second embodiment.

FIGS. 3 and 4 show a second embodiment of the invention. In the second embodiment of the birdhouse 2, the front panel 70 does not have an opening 80. As shown in FIG. 4, the spacer 90 is at the side of the front panel 70, not the bottom. This leaves an opening at the bottom, between the front panel 70 and the front wall 10, which allows a bird, such as a yellow flicker an opening to crawl up and into the birdhouse through opening 60. Typically, the spacer 90 is greater for the second embodiment than the first.

There is about a 100% reduction of blown rain entering the birdhouse with the second embodiment when compared to the cited background references.

Other embodiments of the present birdhouse invention include housing other animals, such as squirrels and raccoons. The dimensions of the house would change in proportion to the size of the animal using the house.

Numerous other advantages and features of the present invention will become readily apparent from the following detailed description of the invention and the embodiments thereof, from the claims, and from the accompanying drawings, in which the details of the invention are fully and completely disclosed as a part of this specification.

The invention claimed is:

1. A birdhouse comprising:
   at least four walls, including a front wall, a back wall, and side walls, defining an interior of the birdhouse;
   wherein each of the walls have a top and a bottom;
   a first gabled roof covering the top of the walls and extending beyond the front wall;
   a bottom panel approximately covering and enclosing the bottom of the at least four walls;
   a first entrance opening in the front wall;
   a front panel attached to the front wall by at least one spacer;
   wherein the front panel has a second gabled roof extending in front of and behind the front panel;
   wherein the front panel has a second entrance opening;
   wherein the front wall, the front panel, and the at least one spacer create a slot;
   wherein the first opening and the second opening are spaced apart, are approximately the same diameter and are approximately horizontally aligned;
   wherein the thickness of the at least one spacer is approximately from one-half to 3 times the diameter of the first opening; and
   wherein the birdhouse provides improved protection to a nest, eggs or fledglings.

2. The birdhouse of claim 1, wherein there is a gap between the first gabled roof and the top of the front wall that provides ventilation to the interior of the birdhouse.

3. The birdhouse of claim 2, wherein the gap is from ¼ to ¾ inches wide.

4. The birdhouse of claim 1, wherein the bottom panel has a drain opening.

5. The birdhouse of claim 4, wherein the birdhouse is made of cedar.

6. The birdhouse of claim 1, wherein the amount of blown rain that can enter the birdhouse is reduced by about two-thirds.

7. The birdhouse of claim 1, wherein the birdhouse is sized to accommodate a squirrel.

8. The birdhouse of claim 1, wherein the birdhouse is sized to accommodate a raccoon.

9. A birdhouse comprising:
   at least four walls including a front wall, a back wall, and side walls, defining an interior of the birdhouse;
   wherein each of the walls have a top and a bottom;
   a first gabled roof covering the top of the walls and extending beyond the front wall;
   a bottom panel approximately covering and enclosing the bottom of the four walls;
   a first entrance opening in the front wall;
   a front panel attached by at least one spacer to the front wall;
   wherein the front panel has a second gabled roof extending in front of and behind the front panel;
   wherein the at least one spacer is placed so that there is an opening at the bottom between the front panel and the front wall;
   wherein the front wall, the front panel, and the at least one spacer create a slot;
   wherein the thickness of the spacer is approximately from one-half to 3 times the diameter of the first opening; and
   wherein the birdhouse provides improved protection to a nest, eggs or fledglings.

10. The birdhouse of claim 9, wherein there is a gap between the first gabled roof and the top of the front wall that provides ventilation to the interior of the birdhouse.

11. The birdhouse of claim 10, wherein the gap is from ¼ to ¾ inches wide.

12. The birdhouse of claim 9, wherein the birdhouse is sized to accommodate a squirrel.

13. The birdhouse of claim 9, wherein the bottom panel has a drain opening.

14. The birdhouse of claim 13, wherein the birdhouse is made of cedar.

15. The birdhouse of claim 10, wherein the amount of blown rain that can enter the birdhouse is reduced by about 100%.

\* \* \* \* \*